US012706878B2

(12) United States Patent
Maia et al.

(10) Patent No.: US 12,706,878 B2
(45) Date of Patent: Aug. 11, 2026

(54) ZERO-TRUST ARCHITECTURE FOR SECURE AGGREGATION IN FEDERATED LEARNING

(71) Applicant: Dell Products L.P., Round Rock, TX (US)

(72) Inventors: Isabella Costa Maia, São Paulo (BR); Paulo Abelha Ferreira, Rio de Janeiro (BR); Pablo Nascimento da Silva, Niterói (BR); Maira Beatriz Hernandez Moran, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 419 days.

(21) Appl. No.: 18/050,324

(22) Filed: Oct. 27, 2022

(65) Prior Publication Data

US 2024/0146690 A1 May 2, 2024

(51) Int. Cl.
*H04L 9/40* (2022.01)

(52) U.S. Cl.
CPC ........ *H04L 63/0236* (2013.01); *H04L 63/083* (2013.01)

(58) Field of Classification Search
CPC .......................... H04L 63/0236; H04L 63/083
See application file for complete search history.

(56) References Cited

U.S. PATENT DOCUMENTS

2020/0285980 A1* 9/2020 Sharad ................... G06N 20/20
2021/0266743 A1* 8/2021 Kvochko .............. H04L 63/102
2024/0020417 A1* 1/2024 Chalk .................. G06F 21/577

OTHER PUBLICATIONS

Rose S, (2022) Zero Trust Architecture. (National Institute of Standards and Technology, Gaithersburg MD), NIST Cybersecurity White Paper (CSWP) 20. https://doi.org/10.6028/NIST.CSWP.20.
Rose S, Borchert O, Connelly S, Mitchel S (2020) Zero Trust Architecture. (National Institute of Standards and Technology, Gaithersburg Md), NIST Special Publication (SP) 800-207. https://doi.org/10.6028/NIST.SP.800-207.
Bonawitz, Keith, et al. "Practical secure aggregation for privacy-preserving machine learning." proceedings of the 2017 ACM SIGSAC Conference on Computer and Communications Security. 2017.
Pasquini, Dario, Danilo Francati, and Giuseppe Ateniese. "Eluding Secure Aggregation in Federated Learning via Model Inconsistency." arXiv preprint arXiv:2111.07380 (2021).

* cited by examiner

*Primary Examiner* — Nicholas P Celani
(74) *Attorney, Agent, or Firm* — Workman Nydegger

(57) ABSTRACT

One example method includes receiving a request for communication between a client node and a server node of a federated learning system. The request is made according to a protocol related to updating a global model by the federated learning system. The protocol defines a first transmission step that should be made during the update of the global model. The request for communication between the client node and the server node is analyzed based in part on credential information and communication information related to the client node and the server node. A secure communication channel is established between the client node and the server node when it is determined that the client node and the server node are to be given access to communicate with each other.

20 Claims, 7 Drawing Sheets

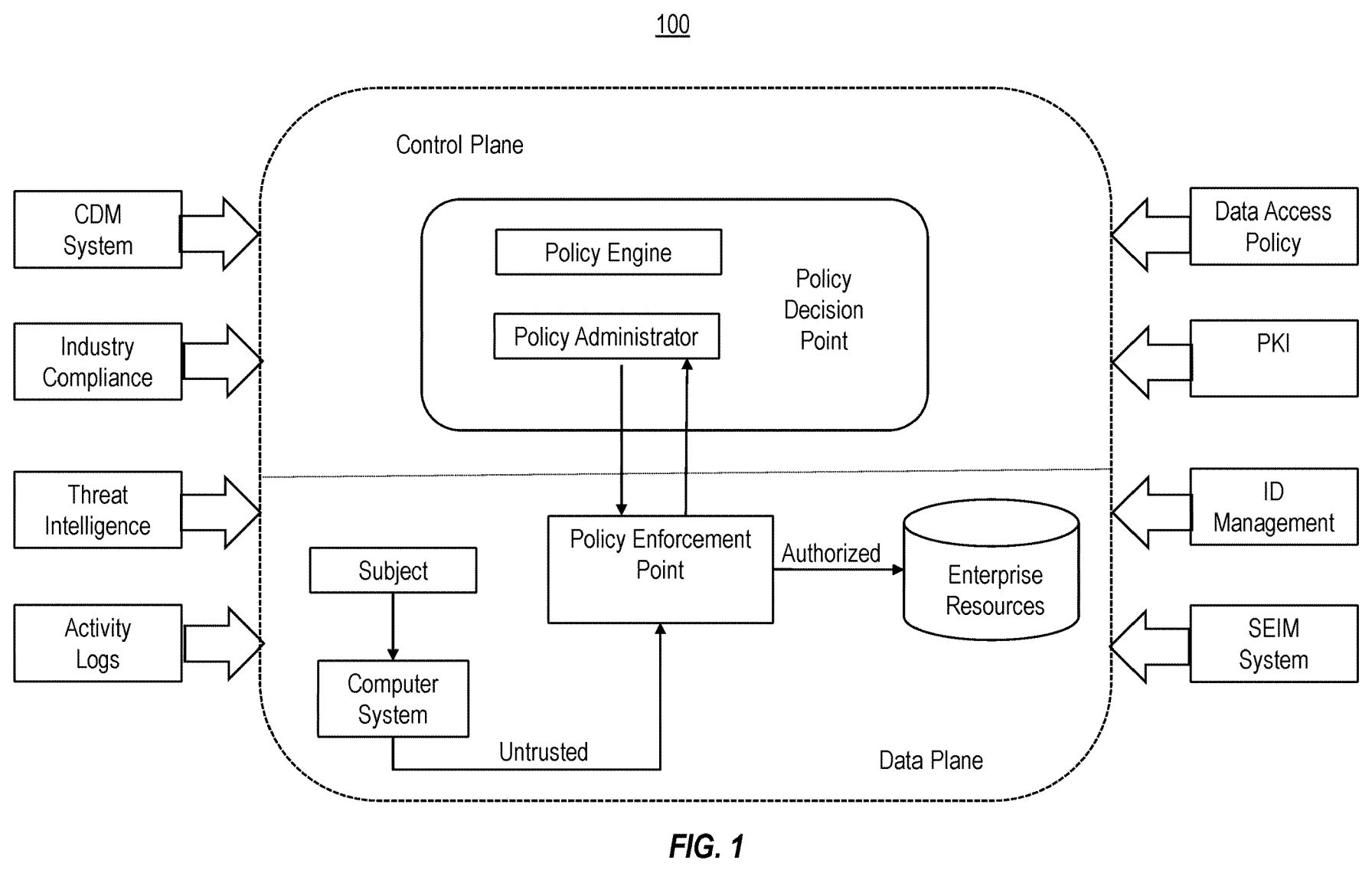

100

Data Access Policy

PKI

ID Management

SEIM System

Control Plane

Policy Decision Point

Policy Engine

Policy Administrator

Data Plane

Enterprise Resources

Authorized

Policy Enforcement Point

Untrusted

Subject

Computer System

CDM System

Industry Compliance

Threat Intelligence

Activity Logs

FIG. 1

ZERO-TRUST ARCHITECTURE FOR SECURE AGGREGATION IN FEDERATED LEARNING

FIELD OF THE INVENTION

Embodiments of the present invention generally relate to federated learning processes. More particularly, at least some embodiments of the invention relate to systems, hardware, software, computer-readable media, and methods for applying a zero-trust architecture to a federated learning system.

BACKGROUND

Federated Learning (FL) consists of a distributed framework for Machine Learning in which a global model is trained jointly by several nodes without ever sharing their local data to a server who controls the global model. Federated Learning has three main stages: local training, aggregation, and local update. In order to improve defense strategies against security threats in FL settings, security during the aggregation stage can be improved through the application of a Secure Aggregation protocol. The Secure Aggregation protocol mitigates security threats by aggregating node gradients and providing only their sum to the server for updating the global model. Thus FL, especially when implementing the Secure Aggregation protocol, is able to provide security and privacy guarantees to users of the FL network. Nevertheless, it has been demonstrated there are security and privacy attacks that present some degree of success even when a Secure Aggregated protocol is implemented. Thus, existing Secure Aggregated protocols may be unable to provide sufficient security guarantees against the ever changing and evolving types of security threats to the FL network.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 1 discloses an embodiment of a conceptual framework for the a Zero Trust Architecture (ZTA);

DETAILED DESCRIPTION OF SOME EXAMPLE EMBODIMENTS

Figure 2:
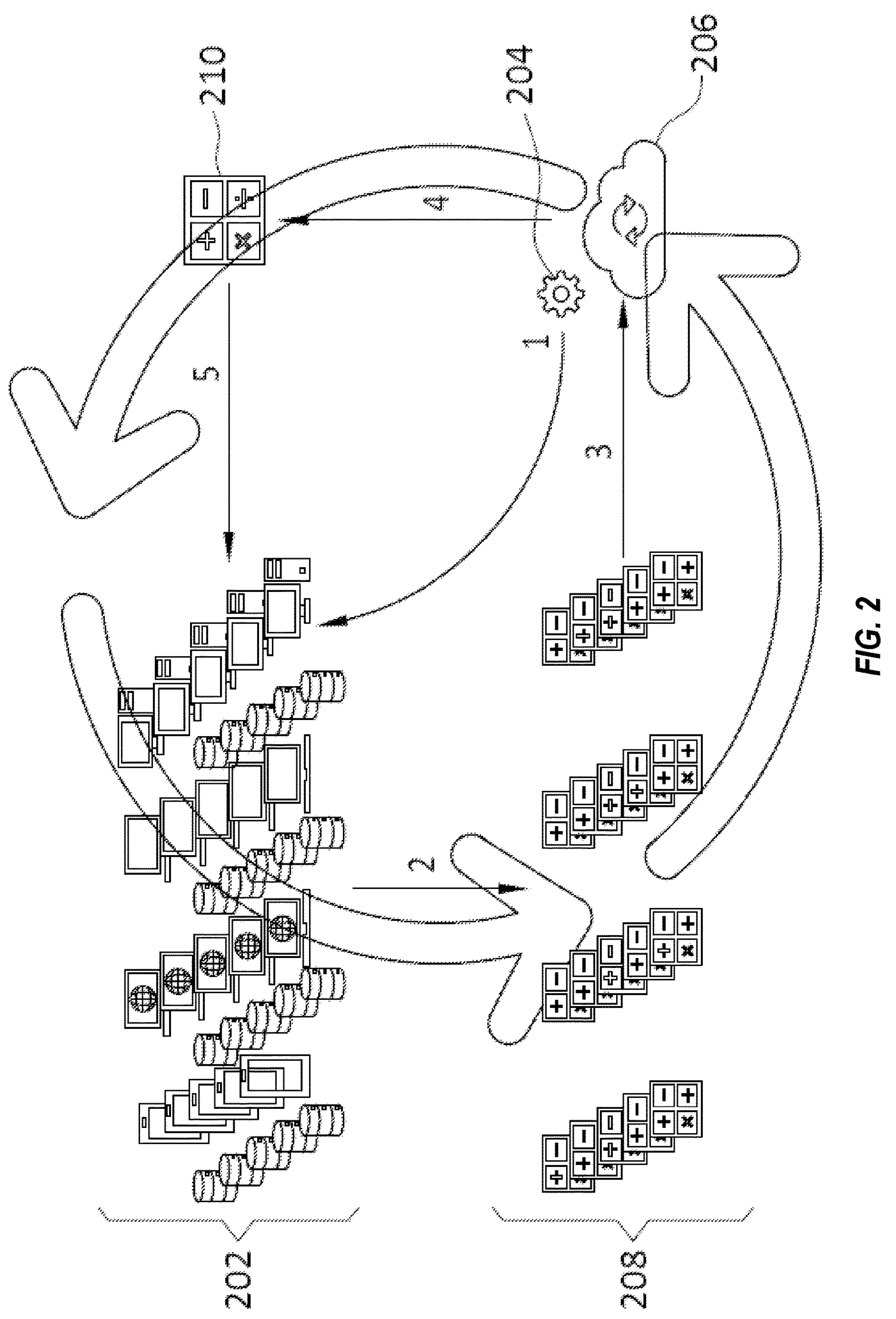
FIG. 2 discloses an example federated learning setting.

Embodiments of the present invention generally relate to federated learning processes. More particularly, at least some embodiments of the invention relate to systems, hardware, software, computer-readable media, and methods for applying a zero-trust architecture to a federated learning system.

One example method includes receiving a request for communication between a client node and a server node of a federated learning system. The request is made according to a protocol related to updating a global model by the federated learning system. The protocol defines a first transmission step that should be made during the update of the global model. The request for communication between the client node and the server node is analyzed based in part on credential information and communication information related to the client node and the server node. A secure communication channel is established between the client node and the server node when it is determined that the client node and the server node are to be given access to communicate with each other.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

In Federated Learning (FL) settings, the main objective is to update a global machine-learning model at a server using local data of different client nodes in an iterative manner. In each global iteration, sampled client nodes run the Stochastic Gradient Descent using their local data to obtain local model updates. These updates are aggregated in order to compute the global model update.

The principles of the present invention alleviate security threats that could be mitigated by additional monitoring and dynamical access grant. A Byzantine attack as well as the case of a dishonest server trying to infer a target client's update are examples of these threats.

The Byzantine as well as poisoning attacks consist of sending manipulated client updates to negatively influence the global model in order to prevent its convergence or control the model response to a certain type of input. In order to provide both privacy and robustness against these attacks, a robust Secure Aggregation protocol step is needed to be able to identify patterns among the Federation.

Besides that, in the Secure Aggregation protocol, it has been shown that it is possible for a dishonest server to nullify the sum of gradients of all client nodes in the federation but one, the target client node. This way, the sum of updates corresponds to the update of the target client itself, making it vulnerable to privacy attacks such as Model Inversion. By monitoring the Federated network, it is possible, for instance, to detect malicious activity of client nodes, based on their updates or even access attempts, and restrict their participation in the Federation, preventing the mentioned attacks. Thus, the Secure Aggregation protocol may not be sufficient for all threats. Accordingly, the principles of the present invention advantageously provide solutions for the security deficiencies that may exist in the Secure Aggregation protocol. In particular, mapping DTP onto the Secure Aggregation protocol provides an advantageous way to increase security in the aggregation stage of FL, thus providing the technical benefits of enhanced security and trust in the FL network and greater reliability in the results of the FL network since it will be less likely that there has been a security breach during operation of the FL network

B. Context

In general, some embodiments are directed to resolving one or more challenges posed by security threats in Federated Learning (FL). Following is contextual information for some example embodiments.

B.1 Aspects of Zero Trust

Zero Trust provides a collection of concepts designed to minimize uncertainty in enforcing accurate, least privilege per-request access decisions in information systems and services in the face of a network viewed as contested. That is, there may be a malicious actor on the network that can intercept or initiate communication. Zero Trust is fundamentally comprised of a set of principles upon which information technology architectures are planned, deployed, and operated. As such, there is no single specific Zero Trust infrastructure implementation or architecture. Zero Trust solutions depend on the workflow being analyzed and the resources that are used in performing that workflow.

FIG. 1 illustrates an embodiment of a conceptual framework 100 that can be used as a tool for the development a Zero Trust Architecture (ZTA) that be used in security applications. The roles of the core components depicted in the embodiment of the conceptual framework 100 are summarized below:

(1) Policy Enforcement Point (PEP): Interacts with applications and endpoints to grant access permission to a resource. Gathers information for PE and follows instructions from PA;

(2) Policy Engine (PE): Evaluates resource access requests based on information from various data sources;

(3) Policy Administrator (PA): Establishes, maintains, and terminates sessions between the subject and resource (4) Information feeds (left and right): Includes a set of codified policies, identities, environmental factors, and historical data used by the PE to generate resource access decisions. In the embodiments disclosed herein, the Public Key Infrastructure (PKI) and the Security Information and Event Management (SIEM) tools are particularly used.

B.1.1 Tenets of Zero Trust for Data Flows

In some embodiments, Zero Trust can be summarized as a set of principles used to plan and implement an IT architecture. Since the principles of the present invention extend the use of Zero Trust in a Secure Aggregation step, the tenets that apply to data flow are highlighted and explained in a Federated Learning context according to the embodiments of the present invention disclosed herein.

I. Network is Always Considered Contested:

In a Zero Trust environment it is assumed that the network, as well as its participants, are never fully trustworthy. It should also be noted that the data transmitted within the network (e.g., gradients, keys) can be intercepted by a third party, maliciously modified (e.g., fake model) or received or sent by an illegitimate peer.

II. Access to Resources is Granted Per-Session:

For every data transmission performed at the Secure Aggregation step, a novel authenticated channel can be established and terminated after completion of the transaction.

III. Access is Given Based on Authentication and Dynamic Policy, Which Comprise Behavioral Attributes From Client, Application, and Resource:

Access requests are analyzed based on information feeds from a PKI module, a SIEM module and an accessed request history. This information is analyzed and learnt at PE by a Data Access Dynamic Policy (DADP) module, and a decision regarding whether to grant access to the requesting party is communicated to PA.

IV. Information From Assets, Network and Communication is Collected to Improve a Security Posture:

For every connection request, regardless of being successful or not, all the related data should be collected to feed analytics and learning tools.

B.2 Aspects of Federated Learning

Federated Learning (FL) is a machine learning technique where the goal is to train a centralized model while the training data, used to train the centralized model, remains distributed on many client nodes. Usually, the network connections and the processing power of such client nodes are unreliable and slow. The main idea is that client nodes can collaboratively learn a shared machine learning model, such as a deep neural network for example, while keeping the training data private on the client device, so the model can be learned without storing a huge amount of data in the cloud, or in the central node. Every process that involves many data-generating nodes may benefit from such an approach, and these examples are countless in the mobile computing world.

In the context of FL, a central node can be any machine with reasonable computational power that receives the updates from the client nodes and aggregates these updates on the shared model. A client node, such as an edge node, may be any device or machine that contains data that will be used to train the machine learning model. Examples of client nodes include, but are not limited to, connected cars, mobile phones, IoT (Internet of Things) devices, storage systems, and network routers.

The training of a Neural Network (or other reasonable machine-learning model) in a Federated Learning setting, shown in the example method of FIG. 2, may operate in the following iterations, sometimes referred to as 'cycles':

1. the client nodes 202 download the current model 204 from the central node 206—if this is the first cycle, the shared model may be randomly initialized;
2. then, each client node 202 trains the model 204 using its local data during a user-defined number of epochs;
3. the model updates 208 are sent from the client nodes 202 to the central node 206—in some embodiments, these updates may comprise vectors containing the gradients;
4. the central node 206 may aggregate these vectors and update the shared model 210; and
5. when the pre-defined number of cycles N is reached, finish the training—otherwise, return to 1.

B.2.1 Aspects of Secure Aggregation Protocol

Model updates transferred between nodes in federated learning still carry information that may be used to infer properties of, or sometimes recover part of, the data used for training. Therefore, under strong privacy guarantees, the federated learning framework described above incorporates a secure aggregation protocol.

Thus, instead of having access to each client update, the server will only have access to a sum of the client updates. More concretely, a protocol may be implemented where the server can only learn the sum of K inputs, but not the individual inputs, where these inputs may be the, relatively large, machine learning model update vectors from each client.

With some embodiments of this protocol, individual users, such as edge nodes, may construct pairwise masking vectors that cancel each other out when summed at the central node. The protocol may begin with an exchange of pairwise keys through a scheme such as the Diffie-Hellman key agreement, for example. Each pairwise key may be used as a seed to a pseudo-random number to generate 0-sum masks for each pair of clients. There is also a part of the protocol for dealing with user dropout, and this may involve a Shamir secret sharing scheme.

Figure 3:
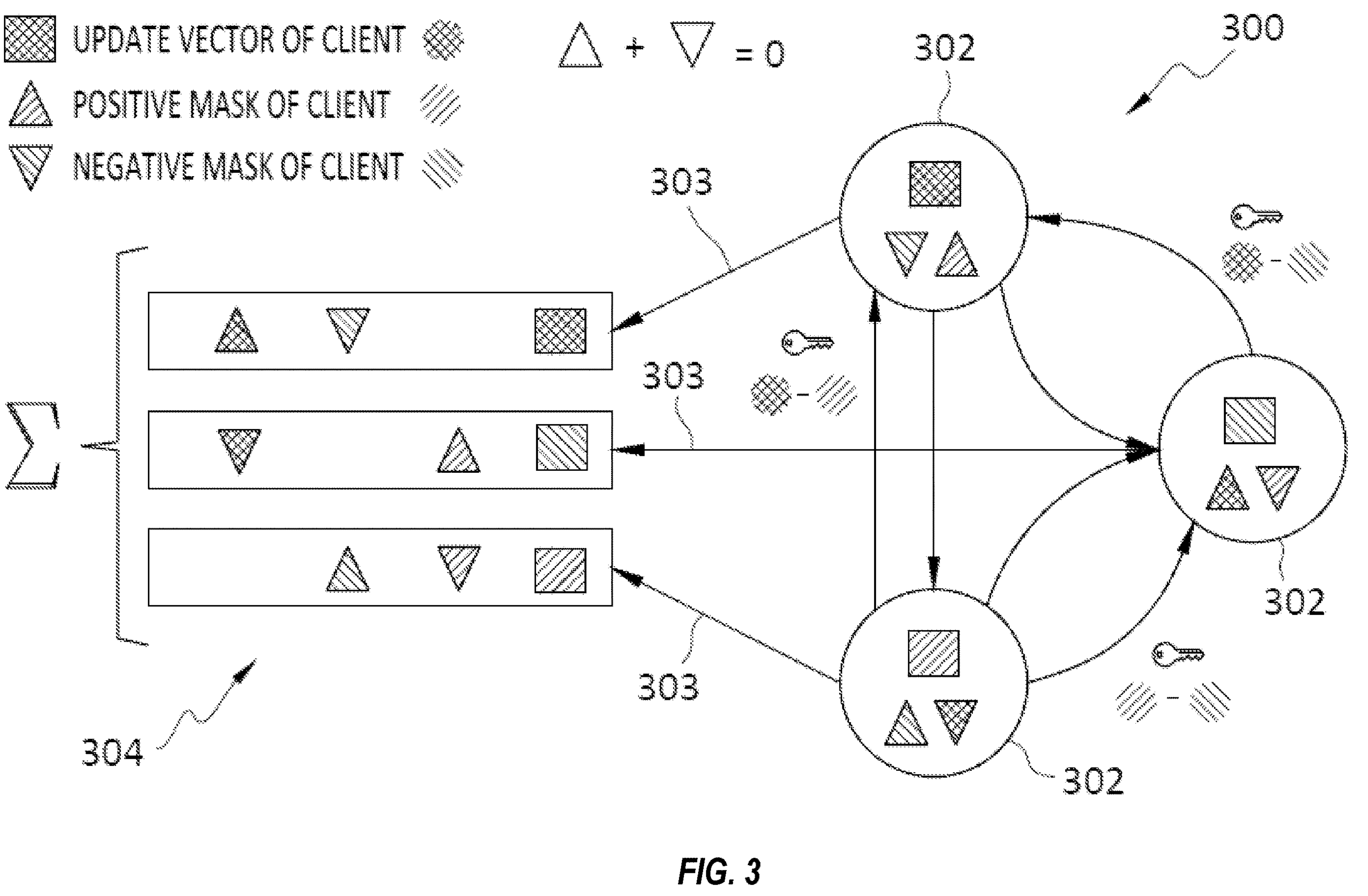
FIG. 3 discloses an overview of an example of a secure aggregation protocol.

In FIG. 3, there is disclosed a graphical representation 300 of a Secure Aggregation protocol, where three nodes 302, or 'clients' in FIG. 3, construct pairwise masks that may be transmitted to the central node 304 as vectors 303, and which may cancel each other out at the central node 304. If a malicious or curious attacker has access to one of the vectors 303 coming from a given participant node 302, the malicious or curious attacker could not access any information since the vector has all the halves from all pairwise masks from each client node 302. The secure aggregation protocol may thus enable calculation of the sum of distributed vectors from a group of nodes, while at least attempting to guarantee that zero information about any particular edge node can be obtained by an entity that access only one of the vectors 303.

Figure 4:
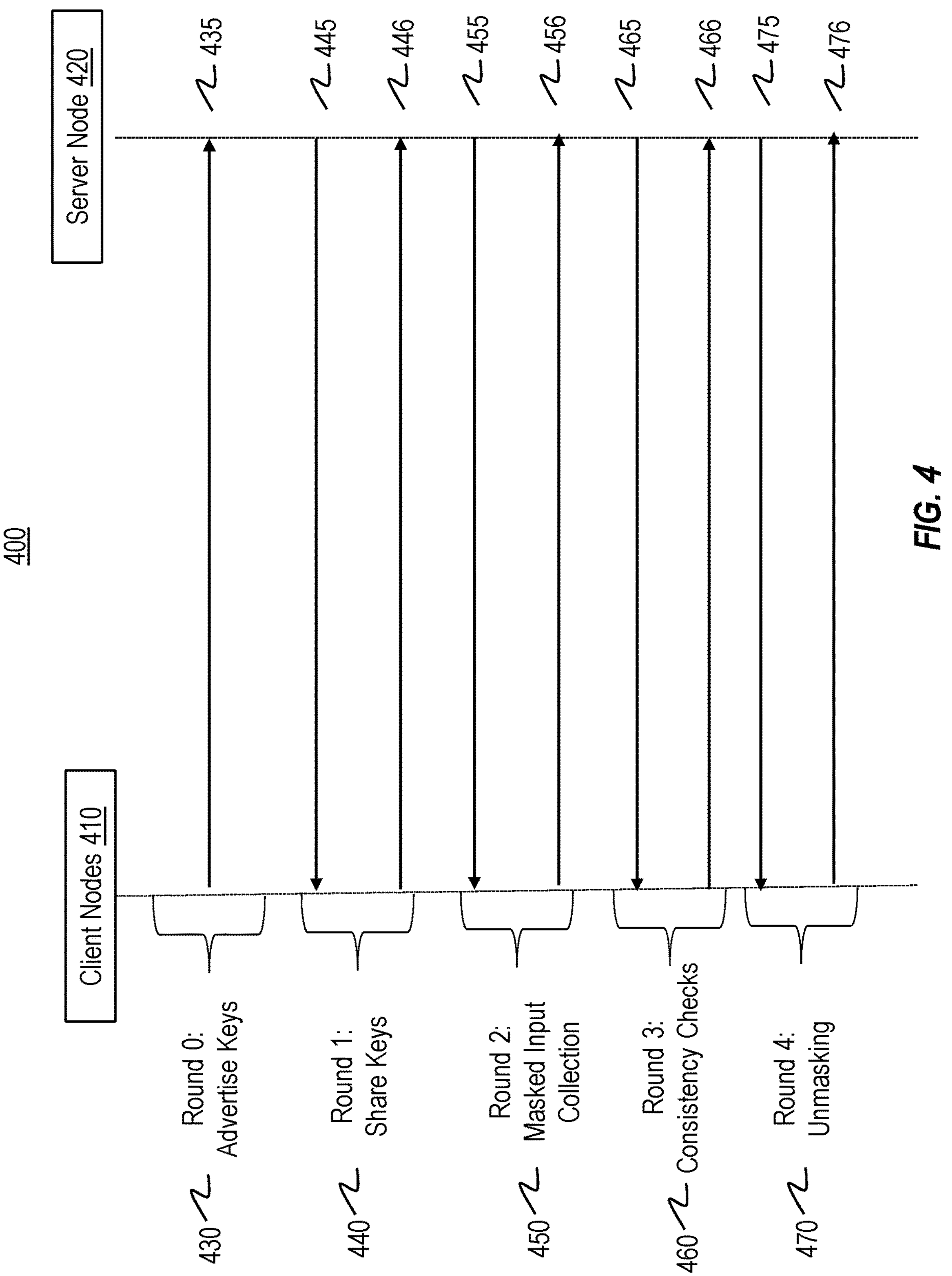
FIG. 4 discloses an overview of an alternative example of a secure aggregation protocol.

FIG. 4 illustrates an alternative view of a graphical representation 400 of a Secure Aggregation protocol. The view of FIG. 4 shows that the Secure Aggregation protocol is defined as a sequence of data transmissions, including, but not limited to, public key exchange, signatures, secret shares, list of online users, between client nodes 410, which are all the client nodes of the federation, and a server node 420 until the server node 420 can finally compute the aggregated sum of updates as previously described. It will be noted that FIG. 4 only shows a summary of the sequence of data transmissions that occur in the Secure Aggregation protocol.

As illustrated in FIG. 4, during a round 0 denoted at 430, public keys are advertised during a data transmission 435. During a round 1 denoted at 440, the public key are shared between the entities during a data transmission 445 and a data transmission 446. During a round 2 denoted at 450, masked inputs are computed and sent during a data transmission 455 and a data transmission 456. During a round 3 denoted at 460, consistency checks are performed during a data transmission 465 and a data transmission 466. During a round 4 denoted at 470, unmasking is performed during a data transmission 475 and 476.

C. Aspects of Data Transmission Protocol (DTP)

The principles of the present invention are related to new and novel solution for enhancing the security in Federated Learning (FL) called Data Transmission Protocol (DTP) in some embodiments. In operation, DTP is configured to map various Zero Trust Architecture (ZTA) components onto the Secure Aggregation protocol, defining specific roles for each entity and an informational flow that reinforces security at the aggregation stage in where the Secure Aggregation protocol. Importantly, DTP advantageously addresses tenets for Data Flow (II), (III) and (IV) discussed previously. As discussed, these tenets are: (II) access to resources is granted per-session, (III) access is given based on authentication and dynamic policy, which comprises behavioral attributes from client, application, and resource, and (IV) information from assets, network and communication is collected to improve security posture.

In embodiments of DTP discussed herein, the main new entities or functional modules transposed from ZTA into the Secure Aggregation domain are the Public Key Infrastructure (PM) module, Security Information and Event Management (STEM) module, Policy Enforcement Point (PEP) module, Policy Engine (PE) module, and Policy Administrator (PA) module, whose communication and roles regulate the usual server/node relationship in FL according to the principles of the present invention.

Accordingly, the principles of the present invention advantageously provide solutions for the security deficiencies that may exist in the Secure Aggregation protocol. In particular, mapping DTP onto the Secure Aggregation protocol provides a new and novel way to increase security in the aggregation stage of FL, thus providing the technical benefits of enhanced security and trust in the FL network and greater reliability in the results of the FL network since it will be less likely that there has been a security breach during operation of the FL network.

Figure 5:
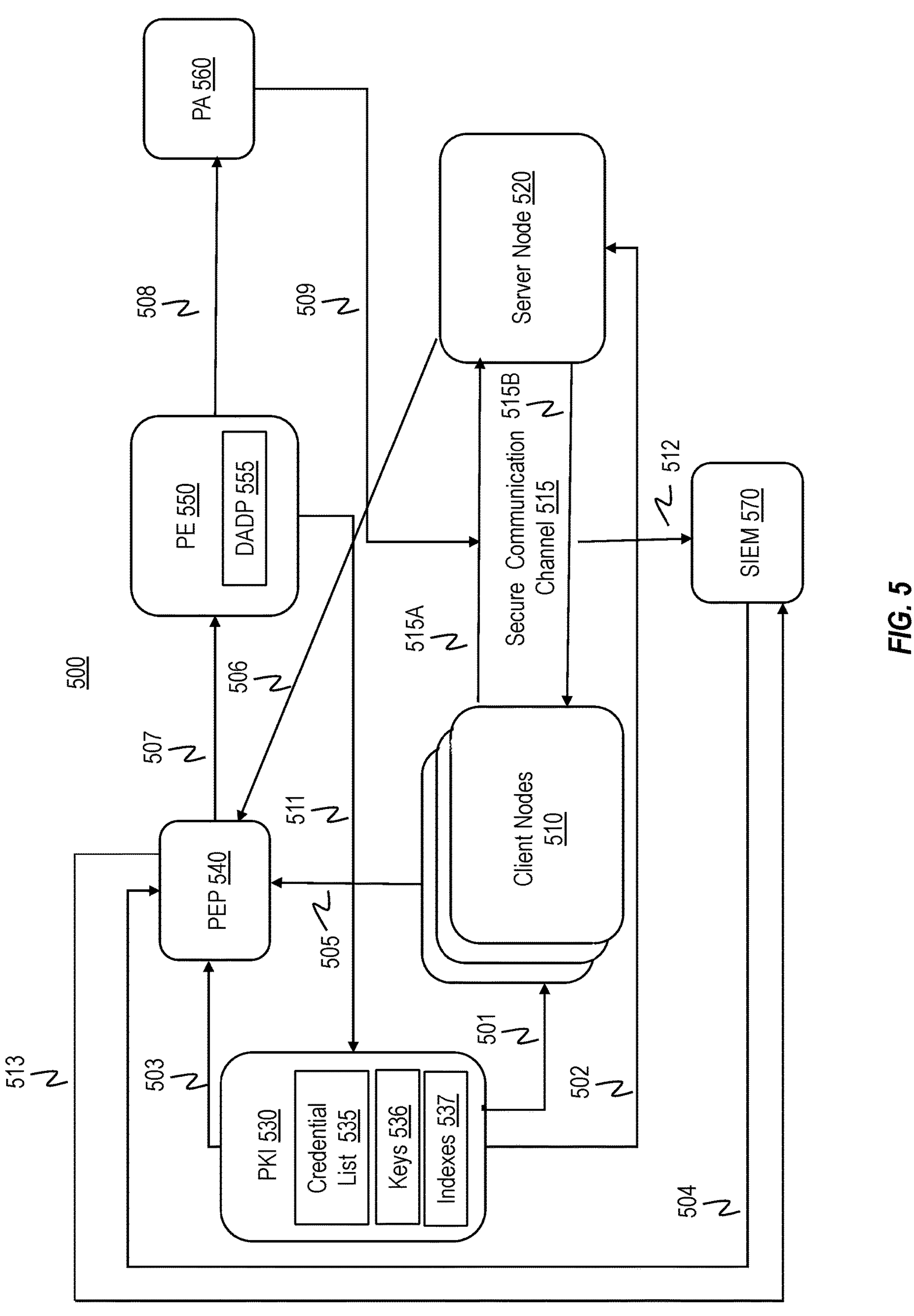
FIG. 5 discloses an overview of an example of a data transmission protocol.

FIG. 5 illustrates an example embodiment of a DTP 500 that is mapped onto the Secure Aggregation protocol during the aggregation phase of the FL process. The process flow of the DTP 500 will now be explained in conjunction with the entities of the DTP 500 and the FL network. It will be appreciated that the entities or functional modules of the DTP 500 may be distributed across the client nodes and server of the federation as needed.

As illustrated, the DTP 500 includes a Public Key Infrastructure (PM) module 530. In operation, the PM module 530 is configured to manage identities and authentications such that any message transmitted by the FL network's participants, such as the client nodes 510 and the server node 520, would be irrevocably indexed by the participant's identity, including its nature indexing as either a client node or a server, and its credential or permissions to be part of the federation.

Accordingly, the PM module 530 maintains a credential list 535 for all the participants of the FL network. The credential list 535 includes credential information that specifies whether each of the client nodes 510 and server node 520 have permission to be part of the federation. The credential list 535 may be updated anytime a new participant joins the federation. In addition, as will be explained in more detail to follow, the credential list 535 may be updated in response to a determination by the DTP 500 that the client nodes 510 and/or the server node 520 are no longer trusted participants of the federation.

The PM module 530 also has access to public and private keys 536 of the one or more client nodes 510 and the server node 520 that may be used in various rounds of the Secure Aggregation protocol as previously described. The PM module 530 further includes indexes 537 that index the client nodes 510 and the server node 520 as being a client node or a server.

As shown at 501, the PM module 530 distributes appropriate public and private keys 536 and indexes 537 to those client nodes 510 that are shown in the credential list 535 to have current valid credentials. Likewise, as shown at 502, the PM module 530 distributes appropriate public and private keys 536 and indexes 537 to the server node 520 when it is shown in the credential list that the server node 520 has current valid credentials.

As shown at 503, the PM module 530 sends a list of valid credentials for each of the client nodes 510 and the server node 520 and their respective indexing 537 to a Policy Enforcement Point (PEP) module 540 of the DTP 500. In operation, the PEP module 540 gathers information from and communicates information to the other entities or functional modules of the DTP 500, in particular on behalf of a Policy Engine (PE) module 550 of the DTP 500 as will be explained. As shown at 504, the PEP module 540 also receives analytical information related to the communication between the client nodes 510 and the server node 520 from a Security Information and Event Management (SIEM) module 570. The SIEM module 570 and its operation will be described in more detail to follow.

According to the embodiments of the current invention, whenever any specific client node 510 desires to communicate with server node 520 during the various rounds of the Secure Aggregation protocol initiated by the client node as shown in FIG. 4, the client node is required to make a demand as shown at 505 for access to such communication to the PEP module 540 before any communication can occur. Likewise, whenever the server node 520 desires to communicate with a specific client node 510 during the various rounds of the Secure Aggregation protocol initiated by the server as shown in FIG. 4, the server is required to make a demand as shown at 506 for access to such communication to the PEP module 540 before any communication can occur.

As shown at 507, the PEP module 540 provides the information it has gathered to the Policy Engine (PE) module 550. As discussed, the gathered information includes the list of valid credentials for each of the client nodes 510 and the server node 520 and their respective indexing 537, the analytical information from the STEM module 570, and the demand 505 or 506 depending on if a client node 510 or the server node 520 made the demand.

In operation, the PE module 550 is configured to determine if the client node 510 and the server node 520 are trusted entities and therefore should be granted access to communicate with each other during the various rounds of the Secure Aggregation protocol. The PE module 550 includes a Data Access Dynamic Policy (DADP) module 555, which may comprise one or more machine-learning models, which determines if access should be given to the client node 510 or the server node 520 making the demand for communication. The determination to grant access to communicate is based upon many factors, such as if the current credentials are valid and does the requesting entity match its indexed identity type. In addition, the DADP module learns from the analytical information received from the SIEM module 570 behavioral trends related to the communication behavior of the client node 510 or the server node 520 making the demand for communication. If the behavioral trends show anomalous behavior, then the PE module 550 may determine that the client node 510 or the server node 520 making the demand for communication is not a trusted entity and therefore should not be allowed to communicate with the entities of the federation.

Likewise, if the current credentials are not valid, or if the indexed identity type is not valid, then the PE module 550 will not allow the client node 510 or the server node 520 making the demand for communication to communicate with the entities of the federation. As shown at 511, whenever the PE module 550 determines that the client node 510 or the server node 520 making the demand for communication should not be allowed to communicate with the entities of the federation, this is reported to the PM module 530. The PM module 530 may then update the credential list 535 to reflect the client node 510 or the server node 520 making the demand for communication is not a trusted entity. In some embodiments, this may result in the non-trusted entity being removed from the credential list 535.

The PE module 550 determines that the client node 510 or the server node 520 making the demand for communication should be granted access to the communicate with the desired entity when the credentials and indexed identity type are valid and when the behavior trends are not anomalous. As shown at 508, the decision to grant access is provided to a Policy Administrator (PA) module 560 of the DTP 500.

In operation, the PA module 560 is configured to establish a secure and exclusive communication channel 515 between the client node 510 and the server node 520 as shown at 509. This allows the client node 510 and the server node 520 to transmit data to each other as illustrated at 515A and 515B while the secure communication channel 515 is maintained by the PA module 560. During the various rounds of the Secure Aggregation protocol, the data transmitted between the client node 510 and the server node 520 will be mainly public keys and gradient sums. At the completion of the data transmission, which may correspond to the completion of a communication round in the Secure Aggregation protocol requested by the client node 510 or the server node 520, the PA module 560 terminates the secure communication channel 515 as also shown at 509 so that the secure communication channel 515 can no longer be used by the client node 510 and the server node 520 to communicate with each other. The client node 510 or server node 520 would need to make a new demand and go through the DTP process again for future communication.

As mentioned previously, the STEM module 570 is part of the DTP 500. The STEM module 570 is configured as an analytics tool that collects historical data from activities related to the communication between a specific client node 510 and the server node 520 such as, but not limited to, type of communication request and its frequency, type of data communicated between the parties, in particular the sum of transmitted gradients transmitted in the aggregation phase of FL, information related to the public and private keys pairs for size and signature checking, latency of transmitted data, time and IP of demands, authentication successes and fails, number of time a client node or the server make a demand, etc. Accordingly, in order to collect this data, the STEM module 570 receives data from the secure communication channel 515 while the secure communication channel is in existence as shown at 512. The STEM module 570 also received data from other entities of the DTP 500 via the PEP module 540 as shown at 513. The STEM module 570 analyzes the data it receives from the secure communication channel and from the other entities of the DTP 500, in some embodiments using one or more machine-learning models, to determine global analytical data that can be used to raise alerts when a suspicious behavior is found. It will be appreciated the STEM module 570 may constantly be receiving data and updating the behavioral trends of the communication data to produce the global analytical data, which is turn can be used by the PE module 550 in determining when communication between a client node 510 and a server node 520 should be granted.

As the current invention has a non-limiting intent of increasing security during the Secure Aggregation protocol, in the embodiments discussed herein each data transmission may be identified by its corresponding round in Secure Aggregation protocol. This allows for the inclusion, for example, in steps such as Round 1 and 4 of FIG. 4, additional pre-built rules in the STEM module 570 that would verify the server node 520's broadcasted signatures and raise an alert in case of abnormal activity such as unmatching signatures or set of unique values less than t, t being the number of shares required to reconstruct a secret in the Secure Aggregation protocol.

Figure 6:
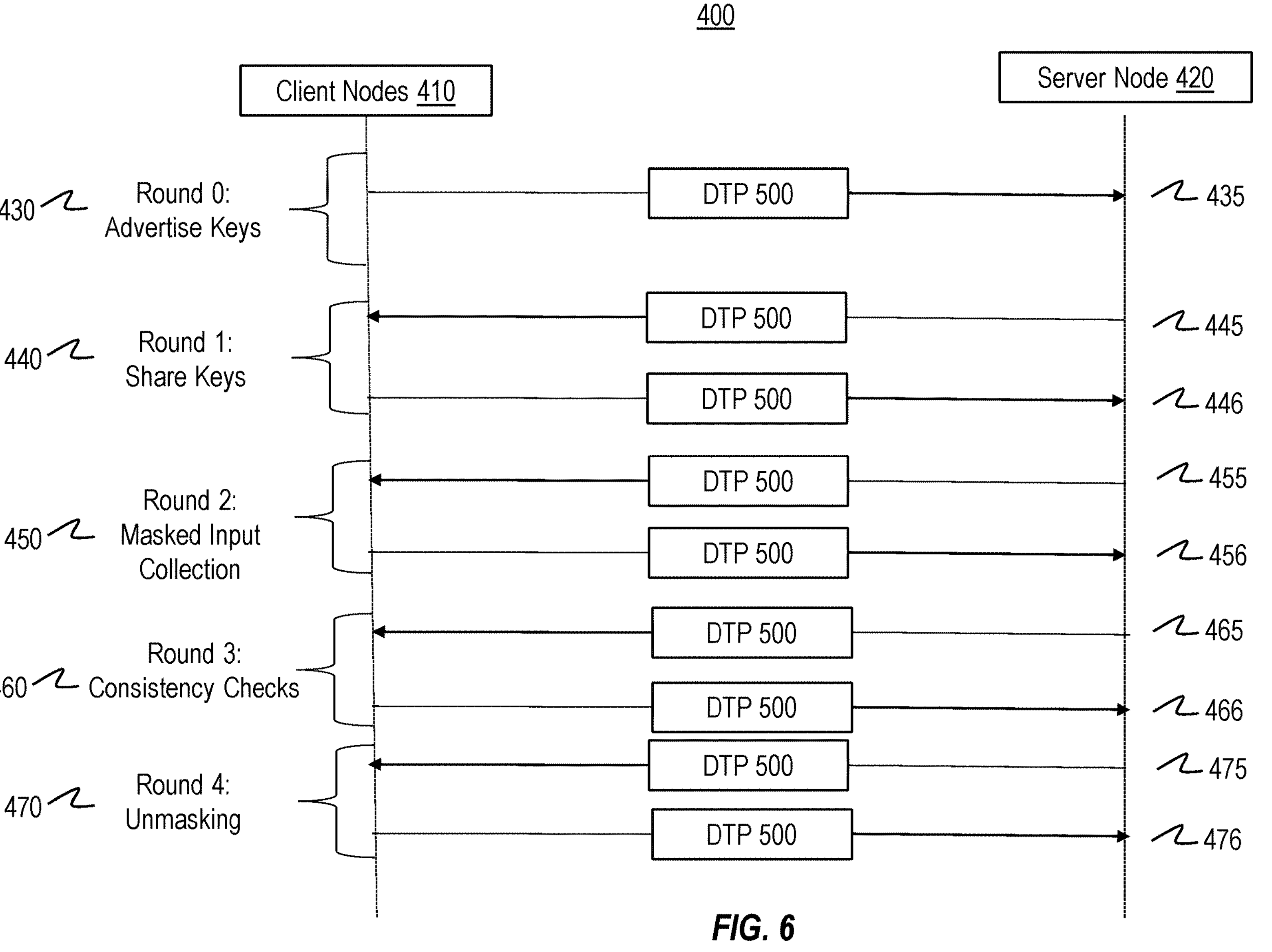
FIG. 6 discloses the mapping of the data transmission protocol into the secure aggregation protocol.

It is important to note that the secure communication channel between the client node 510 and the server node 520 is established and terminated every time data is transmitted in any direction between the client node 510 and the server node 520 during the Secure Aggregation protocol, what happens several times. In other words, the DTP 500 is entirely performed for each one of the arrows in FIG. 4, that is every time a data transmission is requested. This is explicitly illustrated in FIG. 6, which shows an alternative view of the graphical representation 400 of the Secure Aggregation protocol. FIG. 6 shows the DTP 500 is placed in the middle of each of the arrows in the figure, to represent that the DTP 500 is entirely performed for each one of the arrows This way, the communication between a client node 510 and the server node 520 can be interrupted at any time upon the detection of suspicious behavior by the PE module 550 using the information provided by the other entities of the DTP 500, especially the information provided by the SIEM module 570. Events such as transmission of an unmatched signature by the server node 520, out of distribution sum of gradients, or multiple failed access requests are analyzed using correlation rules from the SIEM module 570 and modeled by the DADP module 555, affecting trust of the involved parties.

It will also be noted that in addition to being temporary, the secure communication channel 515 is established by the PA module 560 for the exclusive use of the client node 510 who made the demand from communication and the server node 520 or the server node 520 and the client node 510 that was the subject of the demand for communication from the server node 520. This means that the secure communication channel 515 cannot be used by the client node 510 to communicate with another client node of the federation and cannot be used by the server node 520 to communicate with any other client node of the federation besides the client node that was the subject of the demand for communication. The SIEM module 570 is able to intercept messages between the client node 510 and the server node 520 who are using the secure communication channel 515 for communication in order to build up the global analytical information discussed previously, but it cannot use the secure communication channel 515 to communicate with other entities. Thus, use of the DTP 500 to generate the secure communication channel 515 advantageously provides a very secure communication channel, thus helping to ensure that the required security guarantees of the Secure Aggregation protocol are met by the FL network.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, TO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: receiving a request for communication between a client node and a server node of a federated learning system, the request being made according to a protocol related to updating a global model by the federated learning system, the protocol defining a first transmission step that should be made during the update of the global model; based on receiving the request, determining if the client node and the server node are to be given access to communicate with each other based at least in part on the credential information and the communication information; and establishing a secure communication channel between the client node and the server node when it is determined that the client node and the server node are to be given access to communicate with each other.

Embodiment 2. The method of embodiment 1, further comprising: allowing the client node and the server node to transmit data to each other using the secure communication channel during the first transmission step; and terminating the secure communication channel upon completion of the first transmission step.

Embodiment 3. The method of embodiment 1 and/or 2, further comprising: receiving a second request for communication between the client node and the server node, the second request being made according to the protocol related to updating a global model by, the protocol defining a second transmission step that should be made during the update of the global model; based on receiving the second request, determining if the client node and the server node are to be given access to communicate with each other based at least in part on the credential information and the communication information; and establishing a second secure communication channel between the client node and the server node.

Embodiment 4. The method of embodiment 3, further comprising: allowing the client node and the server node to transmit data to each other using the second secure communication channel during the second transmission step; and terminating the second secure communication channel upon completion of the second transmission step.

Embodiment 5. The method of embodiment 1, 2, 3, and/or 4, wherein the client node and the server node are not able to communicate with any other entity of the federated learning system using the secure communication channel.

Embodiment 6. The method of embodiment 1, 2, 3, 4, and/or 5, wherein the communication information comprises global analytical information based on historical data related to the communication between the client node and the server node.

Embodiment 7. The method of embodiment 1, 2, 3, 4, 5 and/or 6, wherein the credential information includes an identity index for the client node and the server node and one or more permissions that specify that the client node and the server node are to be part of the federated learning system.

Embodiment 8 The method of embodiment 1, 2, 3, 4, 5, 6, and/or 7, further comprising: updating the credential information when it is determined that the client node and the server node are not to be given access to communicate with each other to specify that one of the client node and the server is no longer a trusted entity Embodiment 9. The method of embodiment 1, 2, 3, 4, 5, 6, 7, and/or 8, where the method is performed for all transmission steps defined by the protocol.

Embodiment 10. The method of embodiment 1, 2, 3, 4, 5, 6, 7, 8, and/or 9, wherein the protocol is the Secure Aggregation protocol.

Embodiment 11. A method for performing any of the operations, methods, or processes, or any portion of any of these, or any combination thereof, disclosed herein.

Embodiment 22. A non-transitory storage medium having stored therein instructions that are executable by one or more hardware processors to perform operations comprising the operations of any one or more of embodiments 1-21.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to conduct executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
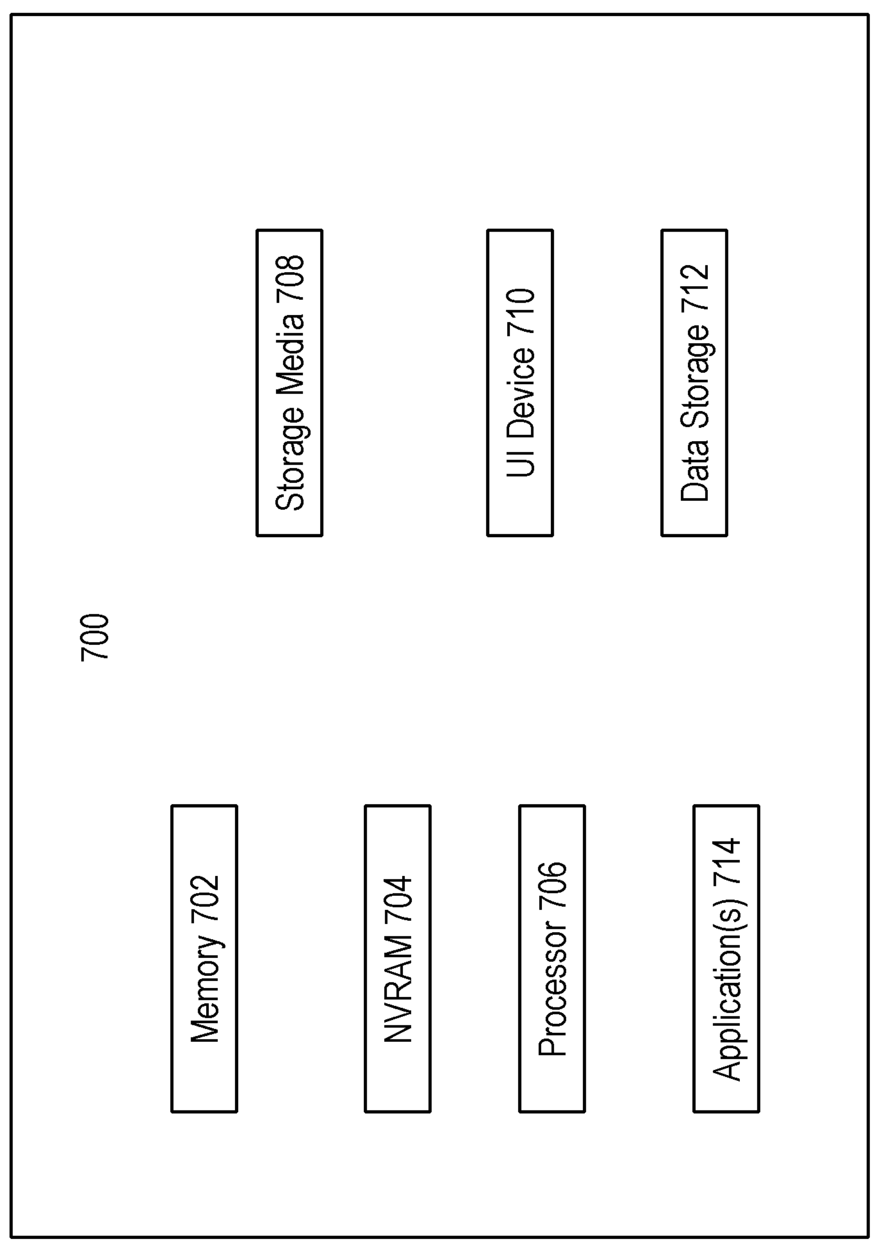
FIG. 7 discloses an example computing entity operable to perform any of the disclosed methods, processes, and operations.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid-state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving a request for communication between a client node and a server node of a federated learning system at a policy enforcement point, the federated learning system including client nodes and the server node, the request being made according to a protocol related to updating a global model by the federated learning system, the protocol defining a first transmission step that should be made during the update of the global model, wherein the first transmission step corresponds to a specific round of a Secure Aggregation protocol and to a specific data transmission within that Secure Aggregation round;

based on receiving the request, determining, by the policy enforcement point, if the client node is given access to communicate with the server node and the server node is to be given access to communicate with the client node based on credential information and communication information that includes behavioral analytics data and historical communication analytics related to communications between the client node and the server node, wherein subsequent communications require a separate request to the policy enforcement point; and establishing a secure communication channel between the client node and the server node when it is determined that the client node and the server node are to be given access to communicate with each other, the secure communication channel being exclusively used by the client node and the server node, being established for the specific round of the Secure Aggregation protocol corresponding to the first transmission step, being established only for the specific data transmission corresponding to the first transmission step and independently of other data transmissions occurring within the same Secure Aggregation round;

allowing transmission of protocol-defined data between the client node and the server node over the secure communication channel during the first transmission step;

terminating the secure communication channel upon completion of the first transmission step;

detecting a trust violation or anomaly in the communications between the client node and the server node during the secure communication channel, wherein detecting the trust violation or anomaly comprises analyzing protocol-semantic data exchanged during the first transmission step, including at least one of cryptographic key material, masked model updates, signature data, or consistency-check data defined by the Secure Aggregation protocol, and, in response to the detected trust violation or anomaly, updating the credential information of at least one of the client node and the server node, wherein the policy enforcement point receives a credential list, the credential list specifying whether the client nodes and the server node have permission to be in the federated learning system, wherein the public key and private keys pairs are distributed to the client nodes and the server node identified as having permission to be in the federated learning system, wherein communication information includes analytical data for communications between each of the client nodes and the server node that includes an indication of a data type communicated between the client nodes and the server node.

2. The method according to claim 1, further comprising:

allowing the client node and the server node to transmit data to each other using the secure communication channel during the first transmission step; and terminating the secure communication channel upon completion of the first transmission step.

3. The method according to claim 1, further comprising:

receiving a second request for communication between the client node and the server node, the second request being made according to the protocol related to updating a global model by, the protocol defining a second transmission step that should be made during the update of the global model;

based on receiving the second request, determining if the client node and the server node are to be given access to communicate with each other based at least in part on the credential information and the communication information; and establishing a second secure communication channel between the client node and the server node.

4. The method according to claim 3, further comprising:

allowing the client node and the server node to transmit data to each other using the second secure communication channel during the second transmission step; and terminating the second secure communication channel upon completion of the second transmission step.

5. The method of claim 1, wherein the client node and the server node are not able to communicate with any other entity of the federated learning system using the secure communication channel.

6. The method of claim 1, wherein the communication information comprises global analytical information based on historical data related to the communication between the client node and the server node.

7. The method of claim 1, wherein the credential information includes an identity index for the client node and the server node and one or more permissions that specify that the client node and the server node are to be part of the federated learning system.

8. The method of claim 1, further comprising:

updating the credential information when it is determined that the client node and the server node are not to be given access to communicate with each other to specify that one of the client node and the server is no longer a trusted entity.

9. The method of claim 1, where the method is performed for all transmission steps defined by the protocol.

10. The method of claim 9, wherein the protocol is Secure Aggregation protocol.

11. A non-transitory storage medium having stored therein instructions that are executable by one or more hardware processors to perform operations comprising:

receiving a request for communication between a client node and a server node of a federated learning system at a policy enforcement point, the federated learning system including client nodes and the server node, the request being made according to a protocol related to updating a global model by the federated learning system, the protocol defining a first transmission step that should be made during the update of the global model, wherein the first transmission step corresponds to a specific round of a Secure Aggregation protocol and to a specific data transmission within that Secure Aggregation round;

based on receiving the request, determining, by the policy enforcement point, if the client node is given access to communicate with the server node and the server node is to be given access to communicate with the client node based on credential information and communication information that includes behavioral analytics data and historical communication analytics related to communications between the client node and the server node, wherein subsequent communications require a separate request to the policy enforcement point; and establishing a secure communication channel between the client node and the server node when it is determined that the client node and the server node are to be given access to communicate with each other, the secure communication channel being exclusively used by the client node and the server node, being established for the specific round of the Secure Aggregation protocol corresponding to the first transmission step, being established only for the specific data transmission corresponding to the first transmission step and independently of other data transmissions occurring within the same Secure Aggregation round;

allowing transmission of protocol-defined data between the client node and the server node over the secure communication channel during the first transmission step;

terminating the secure communication channel upon completion of the first transmission step;

detecting a trust violation or anomaly in the communications between the client node and the server node during the secure communication channel, wherein detecting the trust violation or anomaly comprises analyzing protocol-semantic data exchanged during the first transmission step, including at least one of cryptographic key material, masked model updates, signature data, or consistency-check data defined by the Secure Aggregation protocol, and, in response to the detected trust violation or anomaly, updating the credential information of at least one of the client node and the server node, wherein the policy enforcement point receives a credential list, the credential list specifying whether the client nodes and the server node have permission to be in the federated learning system, wherein the public key and private keys pairs are distributed to the client nodes and the server node identified as having permission to be in the federated learning system, wherein communication information includes analytical data for communications between each of the client nodes and the server node that includes an indication of a data type communicated between the client nodes and the server node.

12. The non-transitory storage medium of claim 11, further comprising:

allowing the client node and the server node to transmit data to each other using the secure communication channel during the first transmission step; and terminating the secure communication channel upon completion of the first transmission step.

13. The non-transitory storage medium of claim 11, further comprising:

receiving a second request for communication between the client node and the server node, the second request being made according to the protocol related to updating a global model by, the protocol defining a second transmission step that should be made during the update of the global model;

based on receiving the second request, determining if the client node and the server node are to be given access to communicate with each other based at least in part on the credential information and the communication information; and establishing a second secure communication channel between the client node and the server node.

14. The non-transitory storage medium of claim 13, further comprising:

allowing the client node and the server node to transmit data to each other using the second secure communication channel during the second transmission step; and terminating the second secure communication channel upon completion of the second transmission step.

15. The non-transitory storage medium of claim 11, wherein the client node and the server node are not able to communicate with any other entity of the federated learning system using the secure communication channel.

16. The non-transitory storage medium of claim 11, wherein the communication information comprises global analytical information based on historical data related to the communication between the client node and the server node.

17. The non-transitory storage medium of claim 11, wherein the credential information includes an identity index for the client node and the server node and one or more permissions that specify that the client node and the server node are to be part of the federated learning system.

18. The non-transitory storage medium of claim 11, further comprising:

updating the credential information when it is determined that the client node and the server node are not to be given access to communicate with each other to specify that one of the client node and the server is no longer a trusted entity.

19. The non-transitory storage medium of claim 11, wherein the operations are performed for all transmission steps defined by the protocol.

20. The non-transitory storage medium of claim 11, wherein the protocol is Secure Aggregation protocol.

* * * * *